United States Patent
Wang

(10) Patent No.: US 9,966,808 B2
(45) Date of Patent: May 8, 2018

(54) MECHANICAL ENERGY-TO-ELECTRICITY TRANSFORMER USING KINETIC ENERGY OF A HYDRAULIC MACHINE

(71) Applicant: Yao-Lin Wang, Taichung (TW)

(72) Inventor: Yao-Lin Wang, Taichung (TW)

( * ) Notice: Subject to any disclaimer, the term of this patent is extended or adjusted under 35 U.S.C. 154(b) by 329 days.

(21) Appl. No.: 15/003,063

(22) Filed: Jan. 21, 2016

(65) Prior Publication Data
US 2017/0085141 A1    Mar. 23, 2017

(30) Foreign Application Priority Data
Sep. 18, 2015    (TW) .............................. 104130942 A

(51) Int. Cl.
| | |
|---|---|
| H02K 21/12 | (2006.01) |
| H02K 1/27 | (2006.01) |
| H02K 3/12 | (2006.01) |
| H02K 7/02 | (2006.01) |
| H02K 3/28 | (2006.01) |

(52) U.S. Cl.
CPC ............ H02K 1/272 (2013.01); H02K 1/2753 (2013.01); H02K 3/12 (2013.01); H02K 3/28 (2013.01); H02K 7/02 (2013.01); H02K 21/12 (2013.01)

(58) Field of Classification Search
CPC ...... H02K 1/274; H02K 1/2753–1/278; H02K 3/28; H02K 21/12
See application file for complete search history.

(56) References Cited

U.S. PATENT DOCUMENTS

2010/0213782 A1*    8/2010    Nashiki ................... H02K 3/28
                                                                    310/195

FOREIGN PATENT DOCUMENTS

TW        I496385 B       8/2015

* cited by examiner

*Primary Examiner* — Ramon M Barrera
(74) *Attorney, Agent, or Firm* — Muncy, Geissler, Olds & Lowe PC

(57) ABSTRACT

A mechanical energy-to-electricity transformer using kinetic energy of a hydraulic machine is provided, including: a power unit, for connecting to the hydraulic machine; a generator, including a rotor, a stator and an output electrode set, the rotor connected to the power unit and twelve magnetic members, the rotor being rotated with a rotational speed lower than or equal to 600 rpm, N pole and S pole of the magnetic members circumferentially alternatively arranged, the stator having thirty-six ditches axially, between every adjacent two ditches forming a tooth, the ditches, teeth, coil units magnetic members defining winding sets circumferentially arranged in intervals by 120 degrees to form a three-phase AC structure electrically connected with the output terminal, the three-phase AC structure being rotatable relative to the magnetic members to generate AC power of 60 Hz and 220 V.

10 Claims, 6 Drawing Sheets

MECHANICAL ENERGY-TO-ELECTRICITY TRANSFORMER USING KINETIC ENERGY OF A HYDRAULIC MACHINE

BACKGROUND OF THE INVENTION

Field of the Invention

The present invention relates to an energy transformer, and more particularly to a mechanical energy-to-electricity transformer using kinetic energy of a hydraulic machine Description of the Prior Art An alternating current (AC) generator can transfer mechanical energy into AC electricity for electronic products to use. Conventionally, the AC generator includes a rotor and a stator, the rotor and the stator rotate relative to each other, the rotor includes a plurality of magnetic members, and the stator has a plurality of coils; therefore, when the rotor is driven by electricity to rotate, magnetic force lines which are produced by magnetic poles of the magnetic members cut the plurality of said coils to produce alternating current. This type of AC generator is disclosed in TW 1496385.

Basically, a voltage put out from the AC generator and a number of coil sets are in positive proportion. Therefore, the denser the coils are, the greater an electricity generation of the AC generator is. However, to produce the alternating current with higher voltage and higher current, greater electricity and other driving energies from outside are required, and energy and cost consumed are greater as well.

In addition, a conventional AC generator produces electricity through rotating in an extremely high speed (for example, thousands or ten thousands rpm); however, the AC generator is easily burned due to high-speed rotation, and the alternating current produced has a high-frequency (far greater than 60 Hz) high voltage (far greater than 220 V). Therefore, the AC generator is unable to provide the electricity which is low-frequency, high-current and high-power, and the alternating current that the AC generator produces needs to be depressurized and rectified before being provided to the electronic products using a normal voltage (220 V, 110 V and 12 V).

The present invention has arisen to mitigate and/or obviate the afore-described disadvantages.

SUMMARY OF THE INVENTION

The major object of the present invention is to provide a mechanical energy-to-electricity transformer using kinetic energy of a hydraulic machine which can put out a low-frequency, high-current and high-power electricity in a low rotational speed to save energy and cost. A switch circuit or/and an overload protector may be further provided to ensure the security of a user.

To achieve the above and other objects, a mechanical energy-to-electricity transformer using kinetic energy of a hydraulic machine is provided, including a power unit, provided for being connected to the hydraulic machine; a generator, including a rotor, a stator rotatably disposed around the rotor and an output electrode set, the rotor including an axle connected to the power unit and twelve magnetic members circumferentially arranged thereon, the rotor being driven by the power unit to rotate in a rotational speed lower than or equal to 600 rpm, N pole and S pole of the magnetic members being circumferentially alternatively arranged, an inner wall of the stator being formed with thirty-six ditches axially, every two ditches neighboring to each other being formed with a tooth therebetween, every three ditches neighboring to each other defining a coil region, every two of the teeth of each said coil region provided with a coil unit, each said coil unit corresponding to one of the magnetic members, every two coil units which are radially opposite to each other forming a winding set, each three winding sets circumferentially arranged in intervals by 120 degrees to form a three-phase AC structure, the three-phase AC structure being electrically connected with the output electrode set, the three-phase AC structure being rotatable relative to the magnetic members to generate AC power of 60 Hz and 220 V.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
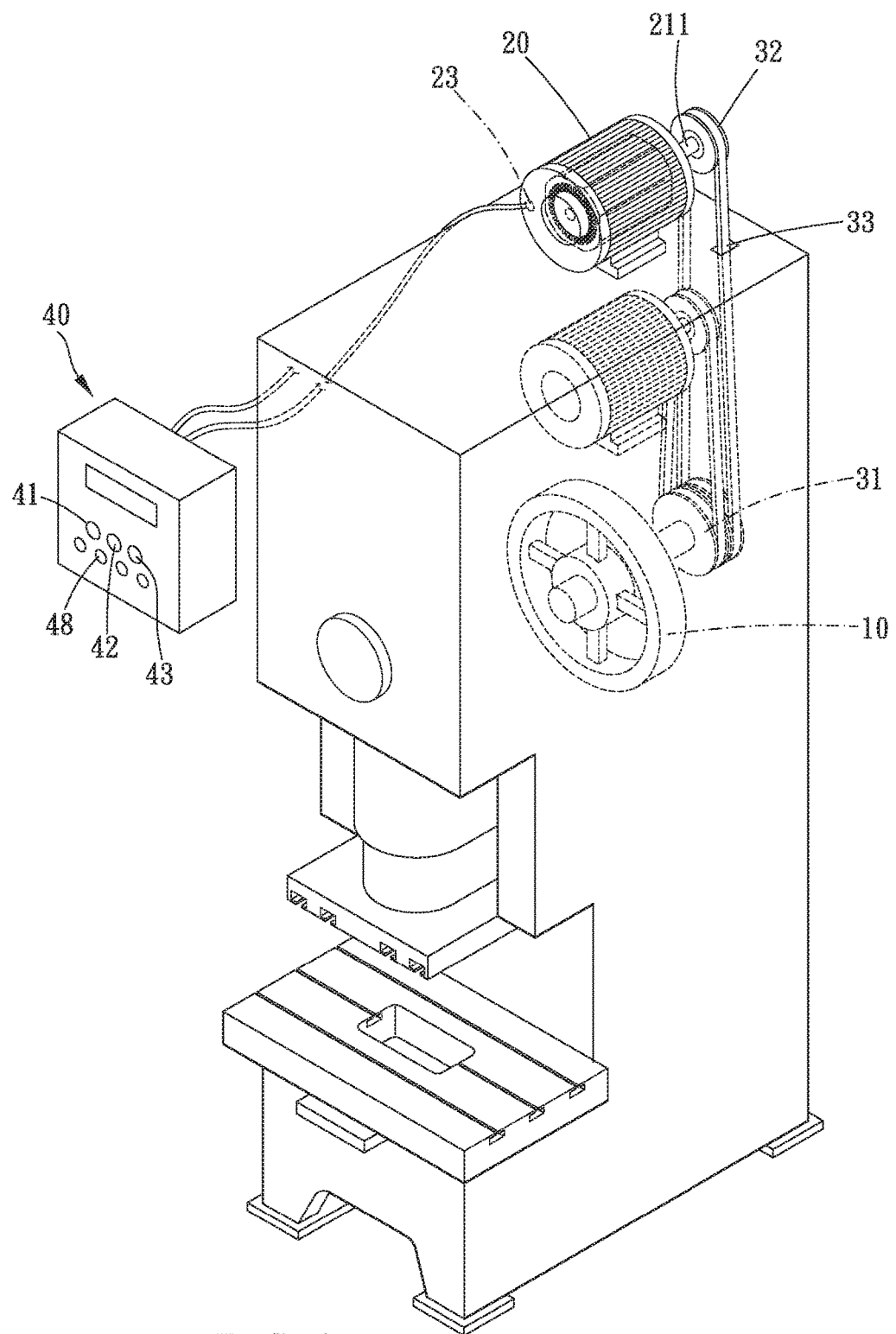
FIG. 1 is a perspective view of a mechanical energy-to-electricity transformer using kinetic energy of a hydraulic machine of a preferred embodiment of the present invention.
Figure 2:
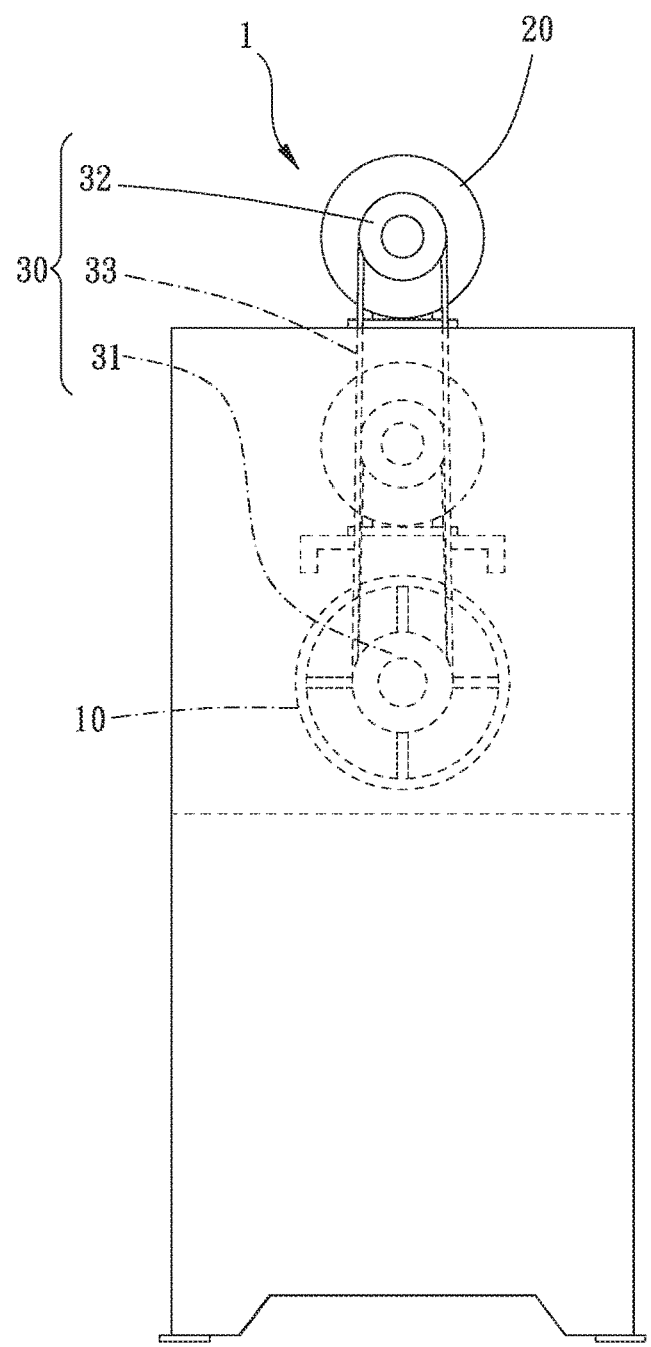
FIG. 2 is a side view of FIG. 1.
Figure 3:
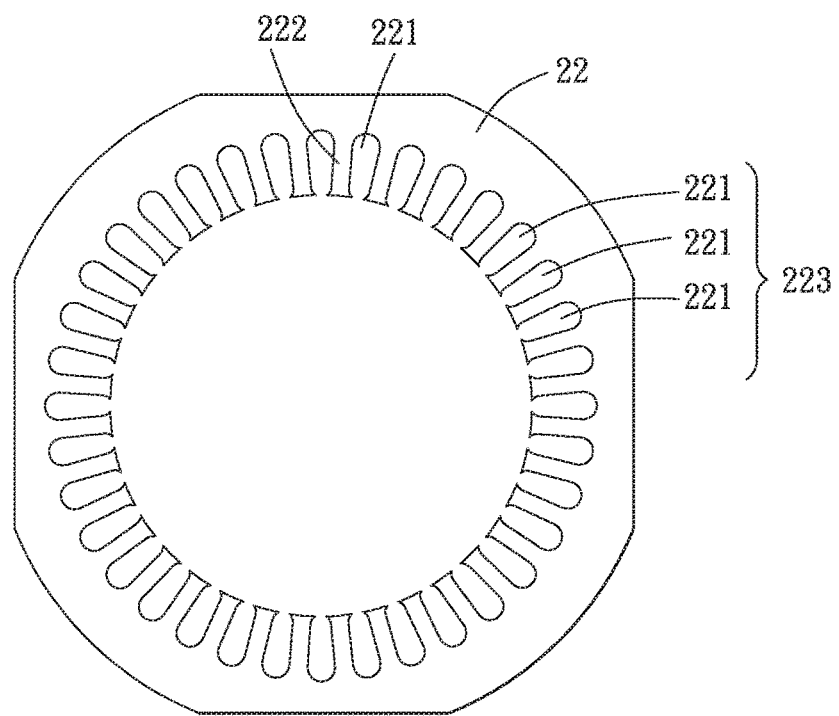
FIG. 3 is a sketch of a stator of the preferred embodiment of the present invention.
Figure 4:
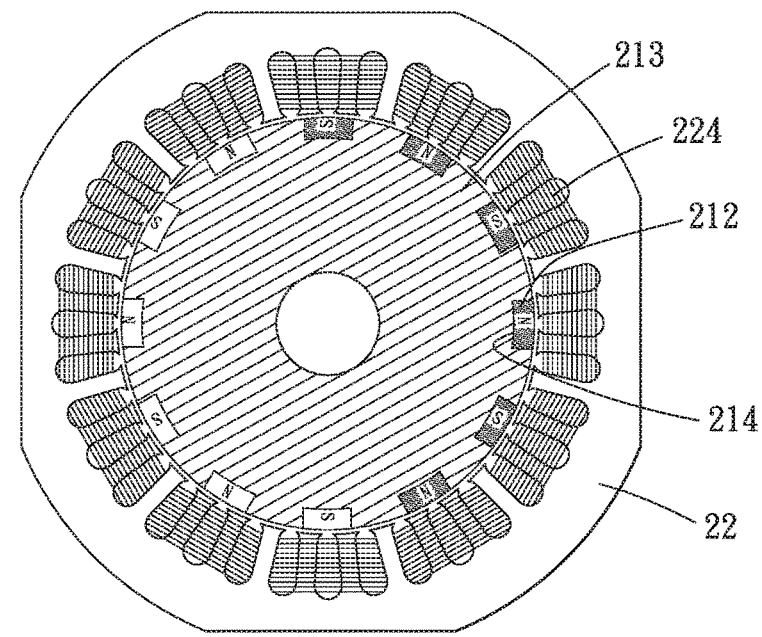
FIG. 4 is a sketch of an assembly of the stator and a rotor of the preferred embodiment of the present invention.
Figure 5:
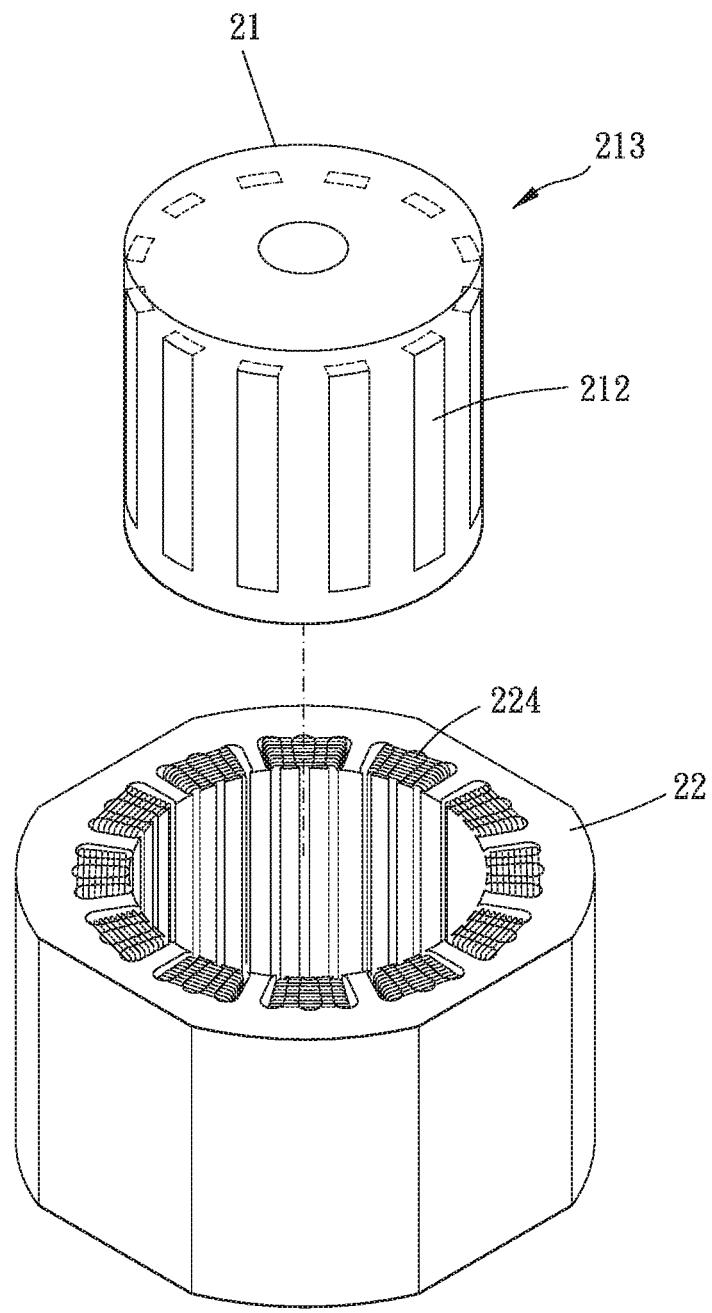
FIG. 5 is a breakdown view of the stator and the rotor of the preferred embodiment of the present invention.
Figure 6:
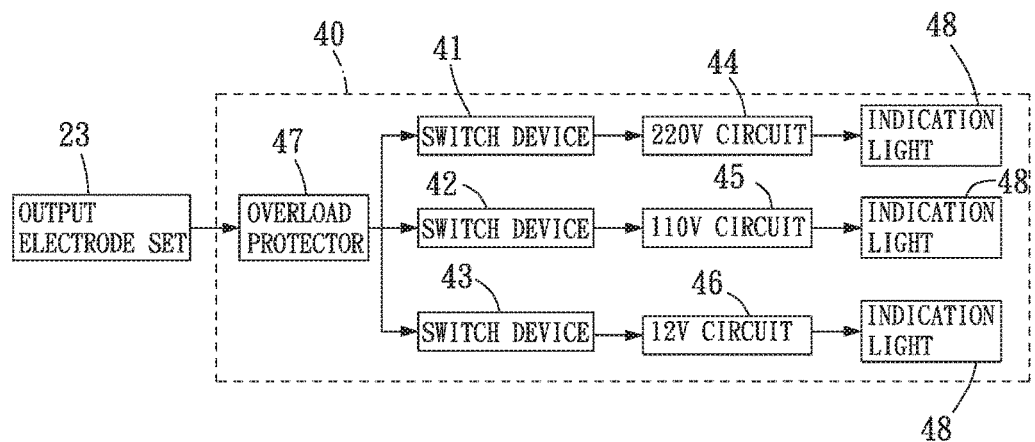
FIG. 6 is a diagram showing a structure of a power distribution unit of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A mechanical energy-to-electricity transformer using kinetic energy of a hydraulic machine 1 includes a power unit and a generator 20. The power unit includes a flywheel 10 for being rotatably assemble to a hydraulic machine The flywheel 10 is for being rotatably assembled to the hydraulic machine and is driven to rotate by a driving unit of the hydraulic machine The hydraulic machine may be, for example, a press or similar machines, and the driving unit may be, for example, a pneumatic motor, an electric motor or similar devices. As the driving unit drives the flywheel 10 to rotate, the flywheel 10 has a great amount of inertia energy for operation of the hydraulic machine and has a great amount of mechanical kinetic energy for driving the generator 20 to rotate easily and continuously.

The generator 20 includes a rotor 21, a stator 22 rotatably disposed around the rotor 21 and an output electrode set 23, and the rotor 21 includes an axle 211 rotatably connected to the flywheel 10 and twelve magnetic members 212 circumferentially arranged thereon. The magnetic members 212 are, for example, permanent magnets, but the magnetic members 212 may also be electromagnets. Preferably, the magnetic members 212 are circumferentially equiangularly arranged.

Specifically, the rotor 21 includes a main body 213, the axle 211 is disposed through the main body 213, the main body 213 is recessed with twelve restriction grooves 214, and the magnetic members 212 are restrictedly disposed in the restriction grooves 214. Specifically, N pole and S pole of each said magnetic member 212 are arranged axially opposite to each other, and N pole and S pole of the magnetic members 212 are circumferentially alternatively arranged. An inner wall of the stator 22 is formed with thirty-six ditches 221 axially, every two ditches 221 neighboring to each other are formed with a tooth 222 therebetween, every three ditches 221 neighboring to each other define a coil region 223, every two of said the teeth 222 of each said coil region 223 is provided with a coil unit 224, each said coil unit 224 corresponds to one of the magnetic members 212, every two coil units 224 which are radially opposite to each other form a winding set, a diameter of a wire of the coil unit 224 is between 0.4 mm and 0.8 mm, and a user may choose the coil unit 224 with different diameters in accordance with different voltages and currents. The coil units 224 are circumferentially equiangularly arranged respectively, and each coil unit 224 corresponds to respective one of said magnetic members 212. Each three winding sets are circumferentially arranged in intervals by 120 degrees to form a three-phase AC structure, and the three-phase AC structure is electrically connected with the output electrode set 23.

The rotor 21 and the flywheel 10 have a preset ratio of rotational speed, under the preset rotational speed ratio, the rotor 21 is driven by the flywheel 10 to rotate in the rotational speed lower than or equal to 600 rpm, and the magnetic members 212 rotate relative to the three-phase AC structure to generate AC power of 60 Hz and 220 V.

In this embodiment, a transmission mechanism 30 is connected with and located between the flywheel 10 and the axle 211, and the transmission mechanism 30 is able to control the preset rotational speed ratio. The transmission mechanism 30 includes a first pace revolving wheel 31 connected with the flywheel 10, a second pace revolving wheel 32 connected with the axle 211 and a driving belt 33 looped on the first and second pace revolving wheels 31, 32. It is understandable that the first pace revolving wheel 31 may be a part of the flywheel 10, and the second pace revolving wheel 32 may be a part of the axle 211. A ratio of radiuses of the first and second pace revolving wheels 31, 32 and the preset rotational speed ratio are in inverse proportion. In other words, the preset rotational speed ratio can be controlled by changing radiuses of the first and second pace revolving wheels 31, 32 so that the mechanical energy-to-electricity transformer of the present invention can be adapted to hydraulic machines operating in different rotational speeds, or produce the rotational speed, output voltage or frequency needed through adjustment of rotational speed ratio. For example, the rotational speed ratio may be adjusted to make the rotor 21 rotate in 300 rpm and put out AC power of 60 Hz and 110 V, but the rotational speed, the frequency and the voltage are not limited thereto.

Preferably, the mechanical energy-to-electricity transformer using kinetic energy of the hydraulic machine 1 further includes a power distribution unit 40 which is electrically connected with the output electrode set 23, the power distribution unit 40 includes a plurality of voltage circuits and at least one switch device which is electrically connected with the voltage circuits, respective one of the output voltages from the voltage circuits is different from each other, the at least one switch device is switchable to allow the output electrode set 23 to electrically communicate with one of the voltage circuits. In this embodiment, the distribution unit 40 includes a plurality of said switch devices 41, 42, 43, the plurality of voltage circuits include a 220V circuit 44, a 110V circuit 45 and a 12V circuit 46 (the examples here are common voltage circuits, and the voltage circuits may be different in accordance with different requirements), the switch devices 41, 42, 43 are electrically connected with the 220V circuit 44, the 110V circuit 45 and the 12V circuit 46 respectively, for selecting output power from one of the 220V circuit 44, the 110V circuit 45 and the 12V circuit 46.

Preferably, the distribution unit 40 further includes at least one overload protector 47 electrically connected with the voltage circuits, and when a current or a voltage of the mechanical energy-to-electricity transformer using kinetic energy of the hydraulic machine 1 is too high, the overload protector 47 can interrupt the circuit to protect a rear-end circuit or an electronic product. In addition, preferably, the distribution unit 40 further includes at least one state indicator which is electrically connected with the voltage circuits, and the at least one state indicator may show the states through light, sound or vibration. For example, the at least one state indicator may include a plurality of indication lights 48 (the indication lights 48 may be in different colors for distinction and may be provided a display screen respectively) which correspond to the 220V circuit, the 110V circuit and the 12V circuit respectively so as to indicate a state of power utilization at the moment and to prevent risks of damaging products, endangering personnel or causing accidental discharge.

Figure 7:
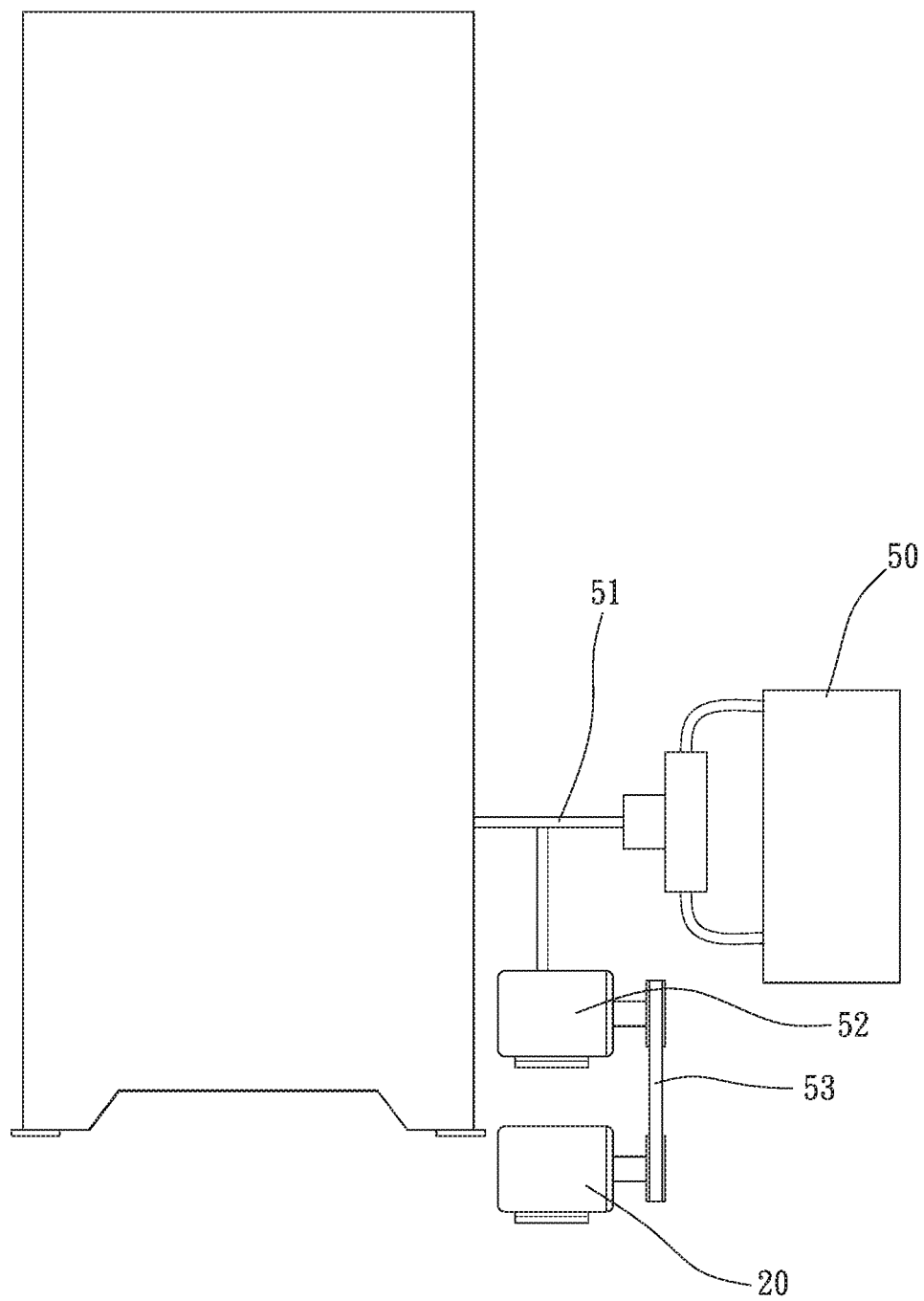
FIG. 7 is a sketch of the mechanical energy-to-electricity transformer using kinetic energy of the hydraulic machine of another preferred embodiment of the present invention.

Please further refer to FIG. 7 for the hydraulic machine of another preferred embodiment of the present invention. The hydraulic machine is, for example, a hydraulic machine for cutting processing. The hydraulic machine is connected to an oil tank 50, a pump pressurizes oil in the oil tank 50 and input the oil through an oil passage 51 to the hydraulic machine for operation of the hydraulic machine The oil passage may be connected with a hydraulic motor 52 and driven by a pulley 53 in the same way as how the generator 20 and the hydraulic motor 52 are driven. The oil is pressurized by the pump to produce an oil pressure to drive the hydraulic motor 52 to rotate and further to drive the generator 20 to rotate to generate electricity.

Given the above, in the present invention, mechanical energy is transferred into electrical energy, and the alternating currents of 220V, 110V or other voltages and of 60 Hz can be produced in the rotational speed equal to or lower than 600 rpm. The user does not need to use additional power (for example, electrical energy), and mechanical energy can be transferred into electrical energy directly for electrical appliances to use. It is energy-saving and cost-saving to use the mechanical energy-to-electricity transformer using kinetic energy of the hydraulic machine In addition, the switch circuit or/and overload protector may be further arranged to ensure the user's security.

While we have shown and described various embodiments in accordance with the present invention, it should be clear to those skilled in the art that further embodiments may be made without departing from the scope of the present invention.

What is claimed is:
1. A mechanical energy-to-electricity transformer using kinetic energy of a hydraulic machine, including:
   a power unit, provided for being connected to the hydraulic machine;

a generator, including a rotor, a stator rotatably disposed around the rotor and an output electrode set, the rotor including an axle connected to the power unit and twelve magnetic members circumferentially arranged thereon, the rotor being driven by the power unit to rotate in a rotational speed lower than or equal to 600 rpm, N pole and S pole of the magnetic members being circumferentially alternatively arranged, an inner wall of the stator being formed with thirty-six ditches axially, every two ditches neighboring to each other being formed with a tooth therebetween, every three ditches neighboring to each other defining a coil region, every two of the teeth of each said coil region provided with a coil unit, each said coil unit corresponding to one of the magnetic members, every two coil units which are radially opposite to each other forming a winding set, each three winding sets circumferentially arranged in intervals by 120 degrees to form a three-phase AC structure, the three-phase AC structure being electrically connected with the output electrode set, the three-phase AC structure being rotatable relative to the magnetic members to generate AC power of 60 Hz and 220 V.

2. The mechanical energy-to-electricity transformer using kinetic energy of the hydraulic machine of claim 1, wherein N pole and S pole of each said magnetic member are axially opposite to each other.

3. The mechanical energy-to-electricity transformer using kinetic energy of the hydraulic machine of claim 1, wherein the power unit includes a flywheel which is for being rotatably assembled to the hydraulic machine, the rotor includes the axle which is rotatably connected with the flywheel, the rotor and the flywheel have a preset ratio of rotational speed, under the preset rotational speed ratio, the rotor is driven by the flywheel to rotate in the rotational speed lower than or equal to 600 rpm, a transmission mechanism is connected with and located between the flywheel and the axle, and the transmission mechanism is able to control the preset rotational speed ratio.

4. The mechanical energy-to-electricity transformer using kinetic energy of the hydraulic machine of claim 3, wherein the transmission mechanism includes a first pace revolving wheel connected with the flywheel, a second pace revolving wheel connected with the axle and a driving belt looped on the first and second pace revolving wheels, and a ratio of radiuses of the first and second pace revolving wheels and the preset rotational speed ratio are in inverse proportion.

5. The mechanical energy-to-electricity transformer using kinetic energy of the hydraulic machine of claim 1, wherein a diameter of a wire of the coil unit is between 0.4 mm and 0.8 mm.

6. The mechanical energy-to-electricity transformer using kinetic energy of the hydraulic machine of claim 1, wherein the magnetic members and the coil units are circumferentially equiangularly arranged respectively.

7. The mechanical energy-to-electricity transformer using kinetic energy of the hydraulic machine of claim 1, wherein the rotor includes a main body, the axle is disposed through the main body, the main body is formed with twelve restriction grooves, and the magnetic members are restrictedly disposed in the restriction grooves.

8. The mechanical energy-to-electricity transformer using kinetic energy of the hydraulic machine of claim 1, further including a power distribution unit which is electrically connected with the output electrode set, the power distribution unit including a plurality of voltage circuits and at least one switch device which is electrically connected with the voltage circuits, respective one of output voltages from the voltage circuits being different from each other, the at least one switch device being switchable to allow the output electrode set to electrically communicate with one of the voltage circuits.

9. The mechanical energy-to-electricity transformer using kinetic energy of the hydraulic machine of claim 8, wherein the power distribution unit further includes at least one overload protector which is electrically connected with the voltage circuits.

10. The mechanical energy-to-electricity transformer using kinetic energy of the hydraulic machine of claim 8, wherein the power distribution unit further includes at least one state indicator which is electrically connected with the voltage circuits.

* * * * *